(12) United States Patent
Furuhashi (10) Patent No.: US 11,862,204 B2
(45) Date of Patent: Jan. 2, 2024

(54) MAGNETIC DISK DEVICE AND METHOD

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Kana Furuhashi, Kawasaki Kanagawa (JP)

(73) Assignees: Kabushiki Kaisha Toshiba, Tokyo (JP); Toshiba Electronic Devices & Storage Corporation, Tokyo (JP)

(*) Notice: Subject to any disclaimer, the term of this patent is extended or adjusted under 35 U.S.C. 154(b) by 0 days.

(21) Appl. No.: 17/897,062

(22) Filed: Aug. 26, 2022

(65) Prior Publication Data
US 2023/0306987 A1  Sep. 28, 2023

(30) Foreign Application Priority Data
Mar. 23, 2022 (JP) ................. 2022-046432

(51) Int. Cl.
| | | |
|---|---|---|
| G11B 27/36 | (2006.01) | |
| G11B 20/18 | (2006.01) | |
| G11B 5/012 | (2006.01) | |
| G11B 21/10 | (2006.01) | |

(52) U.S. Cl.
CPC ............ *G11B 5/012* (2013.01); *G11B 21/106* (2013.01)

(58) Field of Classification Search
CPC .......... G11B 5/54; G11B 20/18; G11B 27/36; G11B 20/12; G11B 20/10222; G11B 5/59633; G11B 5/59638

USPC .................................... 360/25, 31, 48, 51, 53
See application file for complete search history.

(56) References Cited

U.S. PATENT DOCUMENTS

| | | | |
|---|---|---|---|
| 6,920,005 B2 | 7/2005 | Yun | |
| 7,490,259 B2 | 2/2009 | Saitoh | |
| 11,062,733 B2 | 7/2021 | Ehrlich | |
| 2006/0002689 A1* | 1/2006 | Yang | ................ G11B 20/10009 |

FOREIGN PATENT DOCUMENTS

| | | |
|---|---|---|
| JP | 2001-057069 A | 2/2001 |
| JP | 2005-276026 A | 10/2005 |

* cited by examiner

*Primary Examiner* — Nabil Z Hindi
(74) *Attorney, Agent, or Firm* — Kim & Stewart LLP (57) ABSTRACT

A magnetic disk device includes a magnetic disk including a track having a plurality of sectors, a motor configured to rotate the magnetic disk, a magnetic head, and a controller. The controller is configured to perform a first read operation of reading target sectors among the sectors of the track, with the magnetic head during a first revolution of the magnetic disk, detect an off-track state of the magnetic head during the first revolution of the magnetic disk, perform a first error correction with respect to data read from the target sectors during the first read operation, and perform a second read operation of selectively reading a part of the target sectors for which the off-track state has been detected or the first error correction is unsuccessful, with the magnetic head during a second revolution of the magnetic disk.

20 Claims, 10 Drawing Sheets

MAGNETIC DISK DEVICE AND METHOD

CROSS-REFERENCE TO RELATED APPLICATION

This application is based upon and claims the benefit of priority from Japanese Patent Application No. 2022-046432, filed Mar. 23, 2022, the entire contents of which are incorporated herein by reference.

FIELD

Embodiments described herein relate generally to a magnetic disk device and a method.

BACKGROUND

In a magnetic disk device, a magnetic head may be deviated from a target track due to various factors during execution of positioning control of the magnetic head. The deviation of the magnetic head from the target track is called off-track state.

When the off-track state occurs during reading of data from a certain track, data that is completely different from expected data may be read. Therefore, the data read by the magnetic head during the off-track state cannot be used as correct data.

DETAILED DESCRIPTION

Embodiments provide a magnetic disk device and a method capable of efficiently reading data even when the off-track state occurs.

In general, according to an embodiment, a magnetic disk device includes a magnetic disk including a track having a plurality of sectors, a motor configured to rotate the magnetic disk, a magnetic head, and a controller. The controller is configured to perform a first read operation of reading target sectors among the sectors of the track, with the magnetic head during a first revolution of the magnetic disk, detect an off-track state of the magnetic head during the first revolution of the magnetic disk, perform a first error correction with respect to data read from the target sectors during the first read operation, and perform a second read operation of selectively reading a part of the target sectors for which the off-track state has been detected or the first error correction is unsuccessful, with the magnetic head during a second revolution of the magnetic disk.

Hereinafter, the magnetic disk device and method according to embodiments will be described in detail with reference to the accompanying drawings. It is noted that the disclosure is not limited to these embodiments.

First Embodiment

Figure 1:
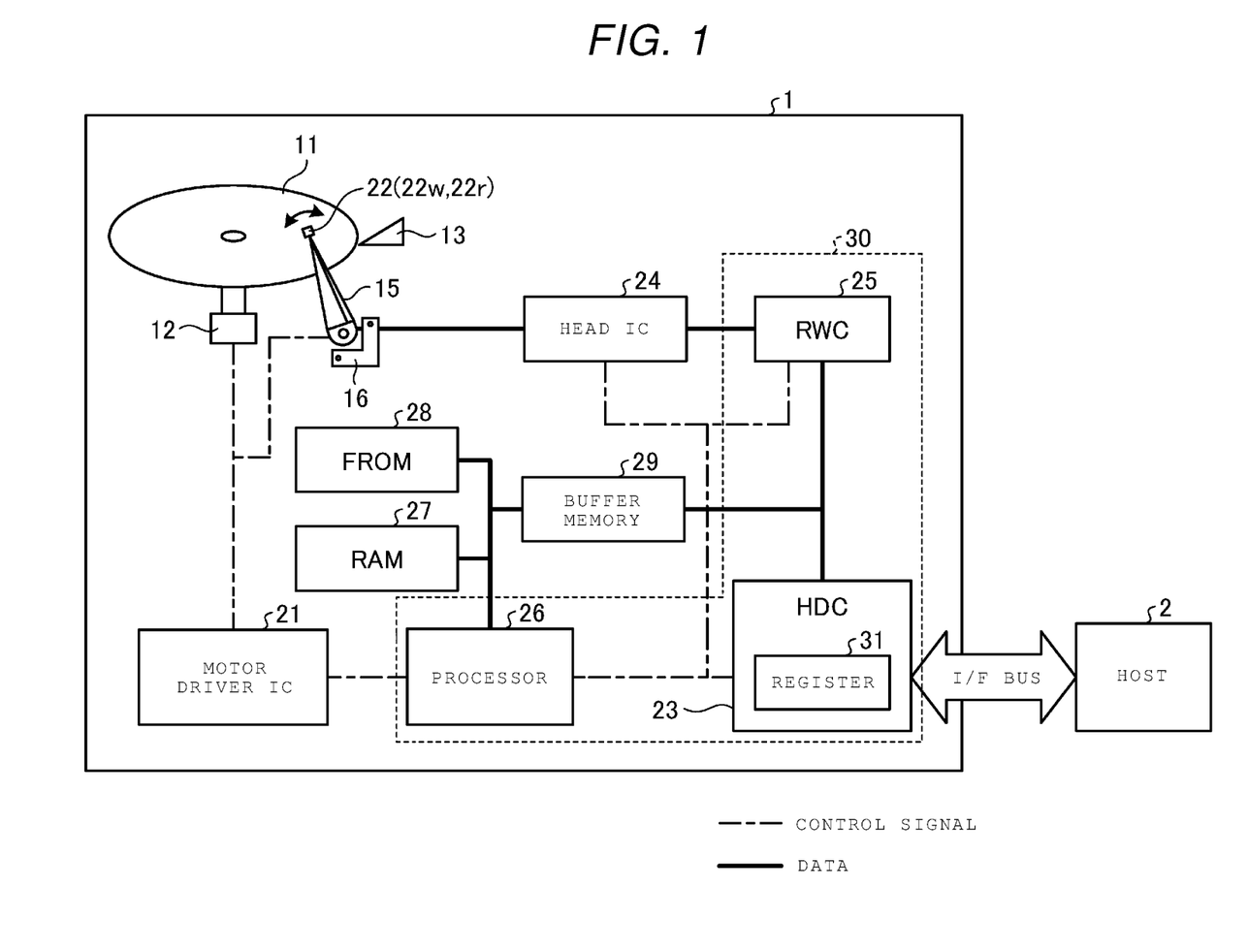
FIG. 1 is a schematic diagram illustrating an example of a configuration of a magnetic disk device according to a first embodiment.

FIG. 1 is a schematic diagram illustrating an example of a configuration of a magnetic disk device 1 according to a first embodiment.

The magnetic disk device 1 is connected to a host 2. The magnetic disk device 1 can receive access commands such as a write command and a read command from the host 2.

The magnetic disk device 1 includes a magnetic disk 11 having a magnetic layer formed on a surface thereof. The magnetic disk device 1 writes data to the magnetic disk 11 or reads data from the magnetic disk 11 according to an access command.

The writing and reading of the data are performed through a magnetic head 22. Specifically, in addition to the magnetic disk 11, the magnetic disk device 1 includes a spindle motor 12, a lamp 13, an actuator arm 15, a voice coil motor (VCM) 16, a motor driver integrated circuit (IC) 21, the magnetic head 22, a hard disk controller (HDC) 23, a head IC 24, a read write channel (RWC) 25, a processor 26, a RAM 27, a flash read only memory (FROM) 28, and a buffer memory 29.

The magnetic disk 11 is rotated at a predetermined rotation speed by the spindle motor 12 mounted coaxially. The spindle motor 12 is driven by the motor driver IC 21.

The processor 26 controls rotation of the spindle motor 12 and rotation of the VCM 16 via the motor driver IC 21.

The magnetic head 22 performs the writing or reading of the data to or from the magnetic disk 11 by a write head $22w$ and a read head $22r$ included therein. Further, the magnetic head 22 is attached to the tip of the actuator arm 15. The magnetic head 22 is moved in the radial direction of the magnetic disk 11 by the VCM 16 driven by the motor driver IC 21.

When the rotation of the magnetic disk 11 is stopped, the magnetic head 22 is moved onto the lamp 13. The lamp 13 is configured so as to retain the magnetic head 22 at a position separated from the magnetic disk 11.

During the reading, the head IC 24 amplifies and outputs a signal read from the magnetic disk 11 by the magnetic head 22 and supplies the signal to the RWC 25. Further, during the writing, the head IC 24 amplifies a signal corresponding to data supplied from the RWC 25 and supplies the signal to the magnetic head 22.

The RWC 25 performs modulation including error correction coding on the data supplied from the HDC 23 and supplies the modulated data to the head IC 24. Further, the RWC 25 performs demodulation including error correction on data read from the magnetic disk 11 and supplied from the head IC 24 and outputs the demodulated data as digital data to the HDC 23.

The HDC 23 performs controlling the transmission/reception of data to/from the host 2, controlling the buffer memory 29, and the like via an I/F bus.

In addition, the HDC 23 also includes a register 31. Information stored in the register 31 will be described below.

The buffer memory 29 is used as a buffer for data transmitted to and received from the host 2. The buffer memory 29 is configured with, for example, a volatile memory capable of a high-speed operation. The type of the memory constituting the buffer memory 29 is not limited to a specific type. The buffer memory 29 may be configured with, for example, a dynamic random access memory (DRAM), a static random access memory (SRAM), or a combination thereof.

The processor 26 is, for example, a central processing unit (CPU). The RAM 27, the flash read only memory (FROM) 28, and the buffer memory 29 are connected to the processor 26.

The FROM 28 stores firmware (e.g., program data), various operating parameters, and the like. It is noted that the firmware may be stored in the magnetic disk 11.

The RAM 27 is configured with, for example, a DRAM, an SRAM, or a combination thereof. The RAM 27 is used as an area where firmware is loaded by the processor 26 or as an area where various management parameters are cached or buffered.

The processor 26 performs overall control of the magnetic disk device 1 according to the firmware stored in the FROM 28. For example, the processor 26 loads the firmware from the FROM 28 to the RAM 27 and executes control of the motor driver IC 21, the head IC 24, the RWC 25, the HDC 23, and the like according to the loaded firmware.

It is noted that the configuration including the RWC 25, the processor 26, and the HDC 23 may also be regarded as a controller 30. In addition to these elements, the controller 30 may include other elements (e.g., the RAM 27, the FROM 28, the buffer memory 29, the RWC 25, and the like).

Further, the firmware program may be stored in the magnetic disk 11. Further, some or all of functions of the controller 30 may be implemented by a hardware circuit such as a field-programmable gate array (FPGA) or an application specific integrated circuit (ASIC).

Figure 2:
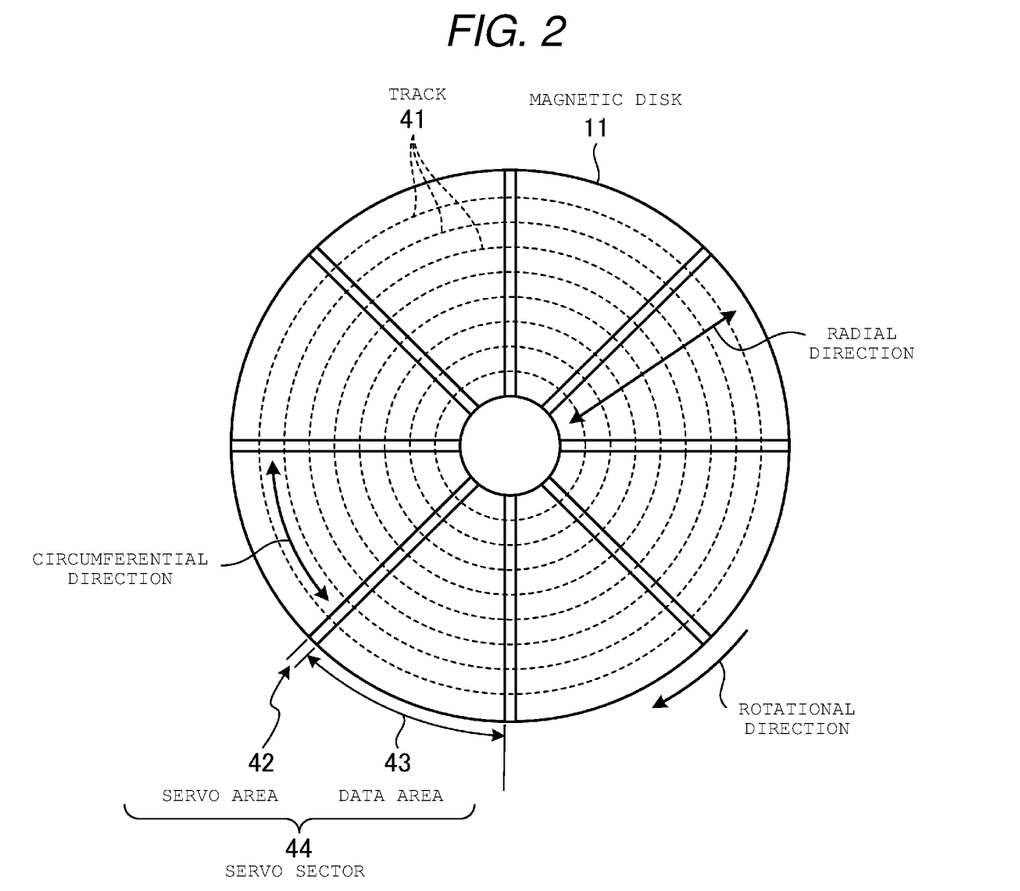
FIG. 2 is a schematic diagram illustrating an example of a configuration of a magnetic disk in the first embodiment.

FIG. 2 is a schematic diagram illustrating an example of a configuration of the magnetic disk 11 in the first embodiment.

In the manufacturing process, servo information is written to the magnetic disk 11, for example, by a servo writer or by self-servo writing (SSW). According to FIG. 2, the servo areas 42 disposed radially are illustrated as a location example of the servo areas in which the servo information is written.

The servo information includes sector/cylinder information, burst patterns, post codes, and the like. The sector/cylinder information may include a servo address (e.g., servo sector address) in the circumferential direction and a track position (e.g., track number) set in the radial direction of the magnetic disk 11. The track number obtained from the sector/cylinder information is an integer value representing the position of the track, and the burst pattern represents an offset amount after the decimal point with respect to the position represented by the track number. The post code is a correction amount for correcting distortion of a shape of the track set on the basis of the burst pattern (more accurately, a combination of the sector/cylinder information and the burst pattern).

Data areas 43 in which data (i.e., data received from the host) can be written are provided between the servo areas 42. One servo area 42 and one data area 43 following the servo area 42 configures a servo sector 44. A plurality of concentric tracks 41 are set in the radial direction of the magnetic disk 11.

A plurality of data sectors are provided in the data areas 43 along each track 41. The writing and reading of the data are executed with respect to each data sector by the magnetic head 22. The storage capacity of each data sector is freely set, but is basically uniform in the magnetic disk 11. Each data sector may be located across a plurality of data areas 43 on one track 41. Alternatively, only one data sector may be provided in each data area 43 on one track 41. Alternatively, the plurality of data sectors may be provided in each data area 43 on one track 41.

Hereinafter, unless otherwise specified, a sector denotes a data sector.

Figure 3:
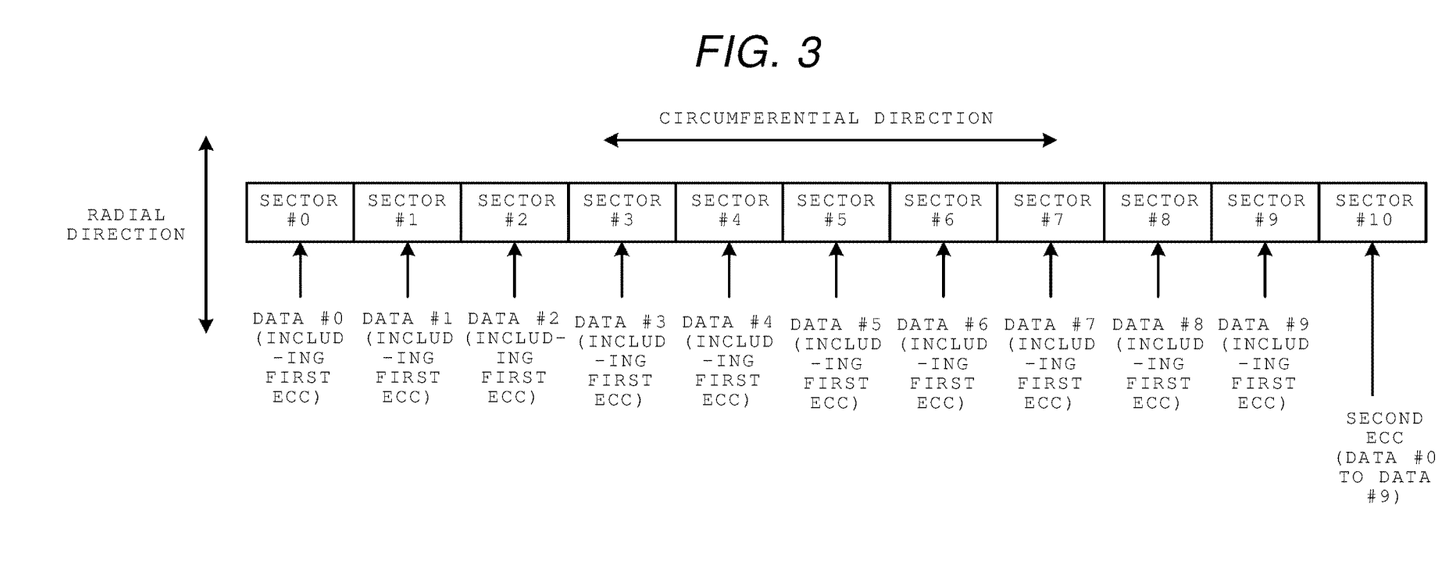
FIG. 3 is a schematic diagram illustrating an example of a configuration of one track in the first embodiment.

FIG. 3 is a schematic diagram illustrating an example of a configuration of one track 41 in the first embodiment. In FIG. 3, the servo area 42 is not illustrated.

Each sector is identified by a sector number. The sector of which sector number is x is referred to as sector #x. In the example illustrated in FIG. 3, the track 41 has 11 sectors from sector #0 to sector #10.

The data written to each sector includes an error correction code (ECC). The RWC 25 can execute sector-by-sector error correction with respect to data read from one sector using the error correction code included therein. The error correction code included in the data written to each sector is referred to as a first ECC. Further, the error correction using the first ECC is referred to as a first correction.

The method of the first ECC is not limited to a specific method. In one example, as the first ECC, a low-density parity-check code is applied.

The writing of data is executed, for example, as follows. First, data including the first ECC is written to each of the sector #0 to the sector #9 in the order of the sector numbers. Then, another error correction code is written to the sector #10 in the end of the track 41. It is noted that the error correction code written to the sector #10 also includes the first ECC.

The error correction code written to the sector #10 is used to protect the data (data #0 to data #9) written to the sector #0 to the sector #9 from occurrence of an error. That is, the error correction code written to the sector #10 is used to protect the data in units of the track 41. The error correction code written to the sector #10 is referred to as a second ECC. Further, the error correction using the second ECC is referred to as a second correction. During the reading of the data from the track 41 protected with the second ECC, when there is a sector in which the first correction fails, the RWC 25 can acquire the expected data of that sector through the second correction.

The method of the second ECC is not limited to a specific method. In one example, the second ECC is generated by bit-wise operation of XOR for data #0 to data #9.

It is noted that, in the first embodiment, implementation of the second correction function is freely performed. For example, in FIG. 3, the sector #10 in the end of the track 41 may store typical data in the same manner as other sectors.

In the read operation, the controller 30 positions the magnetic head 22 on the track 41 (denoted as the target track 41) provided with the sector (denoted as the target sector) of the read target, and then reads the data from the target sector. However, in some cases, during the execution of the positioning control of the magnetic head 22, the off-track state, that is, deviation of the magnetic head 22 from the target track 41 may occur due to various factors such as an impact or vibration applied to the magnetic disk device 1 from the outside. In some cases, if the off-track state occurs when the magnetic head 22 passes through the target sector, the data written to the track 41 adjacent to the target track 41 or old data remaining between the target track 41 and the track 41 adjacent to the target track 41 may be read. That is, in some cases, data different from the data written to the target sector may be read.

As described above, the controller 30 (more accurately, the RWC 25) can correct the error in the data written to each sector through the first correction. However, due to the occurrence of the off-track state, when the data written to the track 41 adjacent to the target track 41 or the old data remaining between the target track 41 and the track 41 adjacent to the target track 41 is read, the first correction may become successful (even though incorrect data is read). Therefore, in a case where the off-track state occurs when the magnetic head 22 passes the target sector, the data after the first correction is not always expected data even when the first correction on the data read from the target sector is successful. Therefore, the data obtained when the off-track state occurs cannot be used even when the first correction is successful.

Herein, a technique to be compared with the first embodiment will be described. The technique to be compared with the first embodiment is referred to as a comparative example. In the comparative example, considered is a case where the plurality of sectors on one track are read targets, in other words, a case where the plurality of target sectors exist on the target track. According to the comparative example, the controller positions the magnetic head on the target track and then executes the read operation with respect to the plurality of target sectors in the order of the sector numbers. The controller executes the first correction with respect to data read from each target sector during the read operation. Typically, one rotation of a magnetic disk enables the read operation on all of the plurality of target sectors. However, when the off-track state occurs during the read operation on any of the plurality of target sectors, the controller executes the read operation again on all of the plurality of target sectors when the magnetic disk further makes one rotation. That is, even when the plurality of target sectors include a sector with respect to which the read operation is executed during the on-track state of the magnetic head and the first correction for the data read from the sector is successful, the read operation is executed again on all of the plurality of target sectors. Therefore, according to the comparative example, when the off-track state occurs, a large amount of time for acquiring the expected data from all the target sectors and a large amount of calculation resources for the first correction are required.

On the other hand, according to the first embodiment, the controller 30 operates as follows. That is, first, the controller 30 executes the read operation on each of all the target sectors when the magnetic disk 11 makes one rotation. The read operation is followed by the first correction. When the off-track state occurs during the read operation on any of the target sectors, the controller 30 executes the read operation again selectively on one or more of the target sectors with respect to which the read operation is performed during the off-track state of the magnetic head 22. This read operation executed secondly or later selectively on the one or more target sectors is also referred to as a read retry operation. The controller 30 does not perform the read retry operation on the target sector with respect to which the read operation is performed during the state where the magnetic head 22 is not off-track state (that is, the on-track state of the magnetic head 22) and the first correction for the read data is successful.

Therefore, according to the first embodiment, when the off-track state occurs, an increase in time for acquiring the expected data from all target sectors and an increase in calculation resources for the error correction can be reduced compared with the comparative example. That is, the data can be read efficiently when the off-track state occurs.

Figure 4:
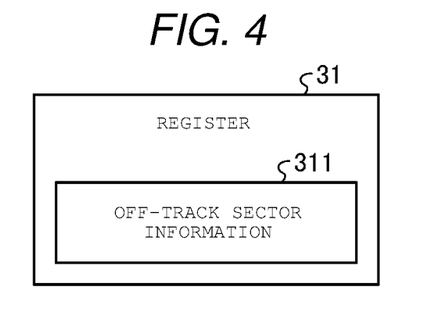
FIG. 4 is a diagram illustrating an example of information stored in a register in the first embodiment.

In the first embodiment, the controller 30 stores information indicating a sector in which the read operation has been performed during the off-track state of the magnetic head 22. Then, the controller 30 selects the target sector of the read retry operation on the basis of the information. This information is referred to as off-track sector information 311 in the present disclosure. The off-track sector information 311 is stored in, for example, the register 31 as illustrated in FIG. 4.

Hereinafter, a sector for which the read operation has been performed during the off-track state of the magnetic head 22 is referred to as an off-track sector. Similarly, a sector for which the read operation has been performed during the on-track state of the magnetic head 22 is referred to as an on-track sector.

Subsequently, the operation of the magnetic disk device 1 according to the first embodiment will be described.

Figure 5:
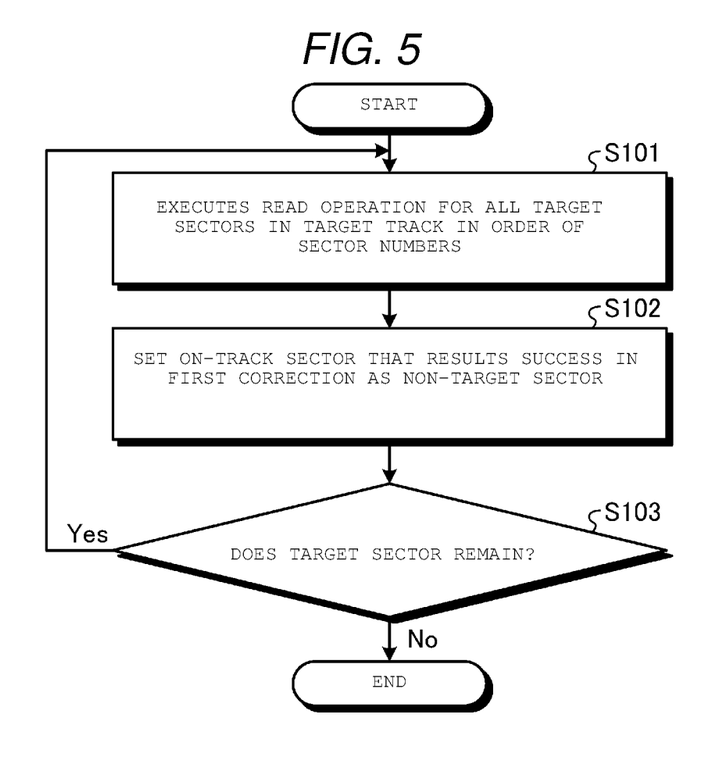
FIG. 5 is a flowchart illustrating an example of a read procedure for a target track by the magnetic disk device according to the first embodiment.

FIG. 5 is a flowchart illustrating an example of a read procedure for the target track 41 by the magnetic disk device 1 according to the first embodiment.

First, the controller 30 executes a read operation on all target sectors in the target track 41 in the order of sector numbers during one rotation of the magnetic disk 11 (S101).

Figure 6:
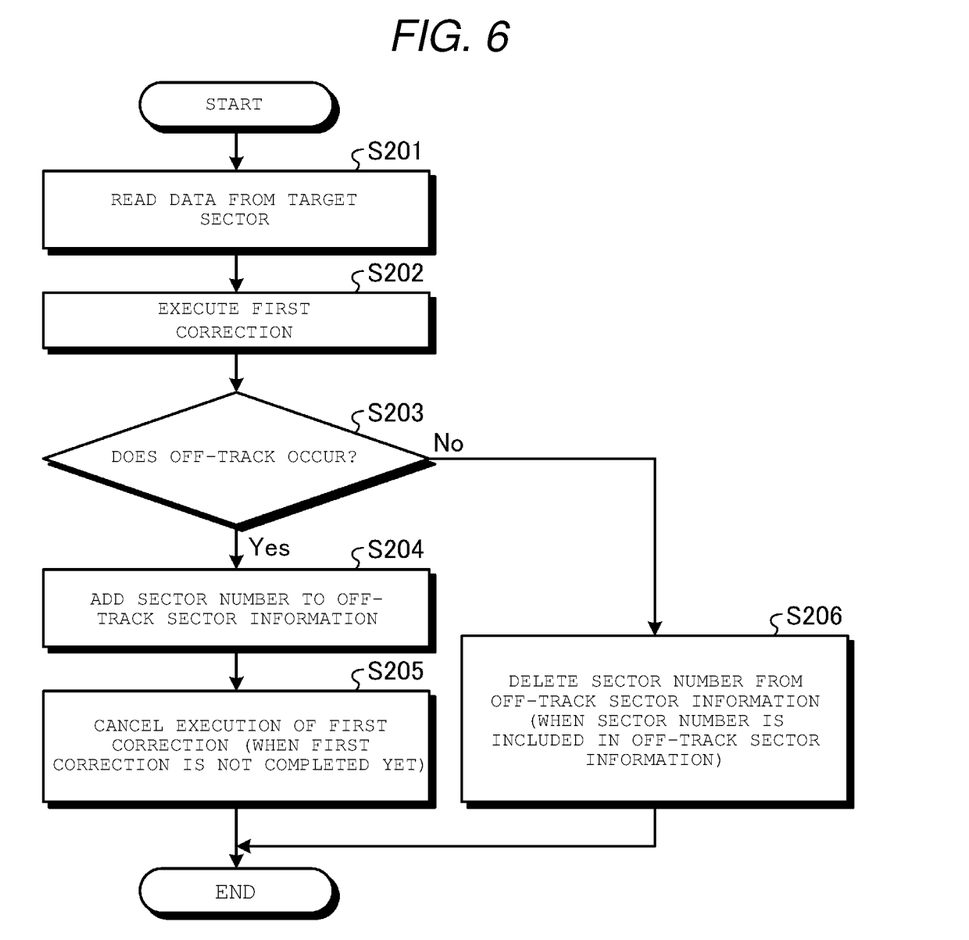
FIG. 6 is a flowchart illustrating an example of a procedure of a read operation on one target sector by the magnetic disk device according to the first embodiment.

FIG. 6 is a flowchart illustrating an example of a procedure of the read operation on one target sector by the magnetic disk device 1 according to the first embodiment.

First, the RWC 25 reads data from the target sector (S201). Then, the RWC 25 executes the first correction on the data read from the target sector (S202).

During the read operation of the target sectors, whether the off-track state occurs is periodically determined at very short time intervals. In one example, each time the magnetic head 22 passes through the servo area 42, the controller 30 acquires a deviation amount of the current radial position of the magnetic head 22 from the center of the target track 41 on the basis of the servo information read from the servo area 42. When the deviation amount is less than a predetermined value, the controller 30 determines that the magnetic head 22 is in the on-track state. When the deviation amount exceeds a predetermined value, the controller 30 determines that the magnetic head 22 is in the off-track state, that is, the off-track state occurs.

It is noted that the method for determining whether the off-track state occurs is not limited to the above-mentioned example. Further, the setting of the timing for determining whether the off-track state occurs is not limited to the above-mentioned example. Further, any component in the controller 30 can execute the determination as to whether the off-track state occurs. For example, whether the off-track state occurs may be determined by the RWC 25 or may be determined by the processor 26. Hereinafter, determining that the off-track state occurs may be described as detecting the off-track state.

The controller 30 executes the determination of whether the off-track state occurs, and when the off-track state is detected (S203: Yes), the controller 30 adds the sector number of the target sector in the off-track sector information 311 (S204). Then, when the first correction started in S202 is not completed yet, the RWC 25 cancels the execution of the first correction (S205). The cancellation of the first correction denotes that the first correction is not performed when the first correction has not started yet, and the first correction is terminated when the first correction has been started (but not completed). After the process of S205, the read operation on the target sector ends.

When the first correction is completed without detecting the off-track state during the read operation (S203: No), the controller 30 deletes the sector number of the target sector from the off-track sector information 311 (S206). When the sector number of the target sector is not included in the off-track sector information 311, the process of S206 is skipped. After the process of S206, the read operation on the target sector is completed.

The series of operations illustrated in FIG. 6 are executed on each target sector in S101 of FIG. 5.

The description is returned to FIG. 5.

When the read operation on all the target sectors in the target track 41 is completed, the controller 30 sets each of on-track target sectors for which the first correction is successful as a non-target sector (S102). That is, the controller 30 excludes the sector with respect to which the read operation is executed during the on-track state of the magnetic head 22 and from which error-corrected data is acquired from the target of the read retry operation. The controller 30 specifies the off-track sector by, for example, referring to the off-track sector information 311.

Subsequently, the controller 30 determines whether the target sector remains (S103). When the target sector remains (S103: Yes), the control proceeds to S101, and the read operation, that is, the read retry operation is executed again for all remaining target sectors.

When no target sector remains (S103: No), the reading from the target track 41 is completed.

Figure 7:
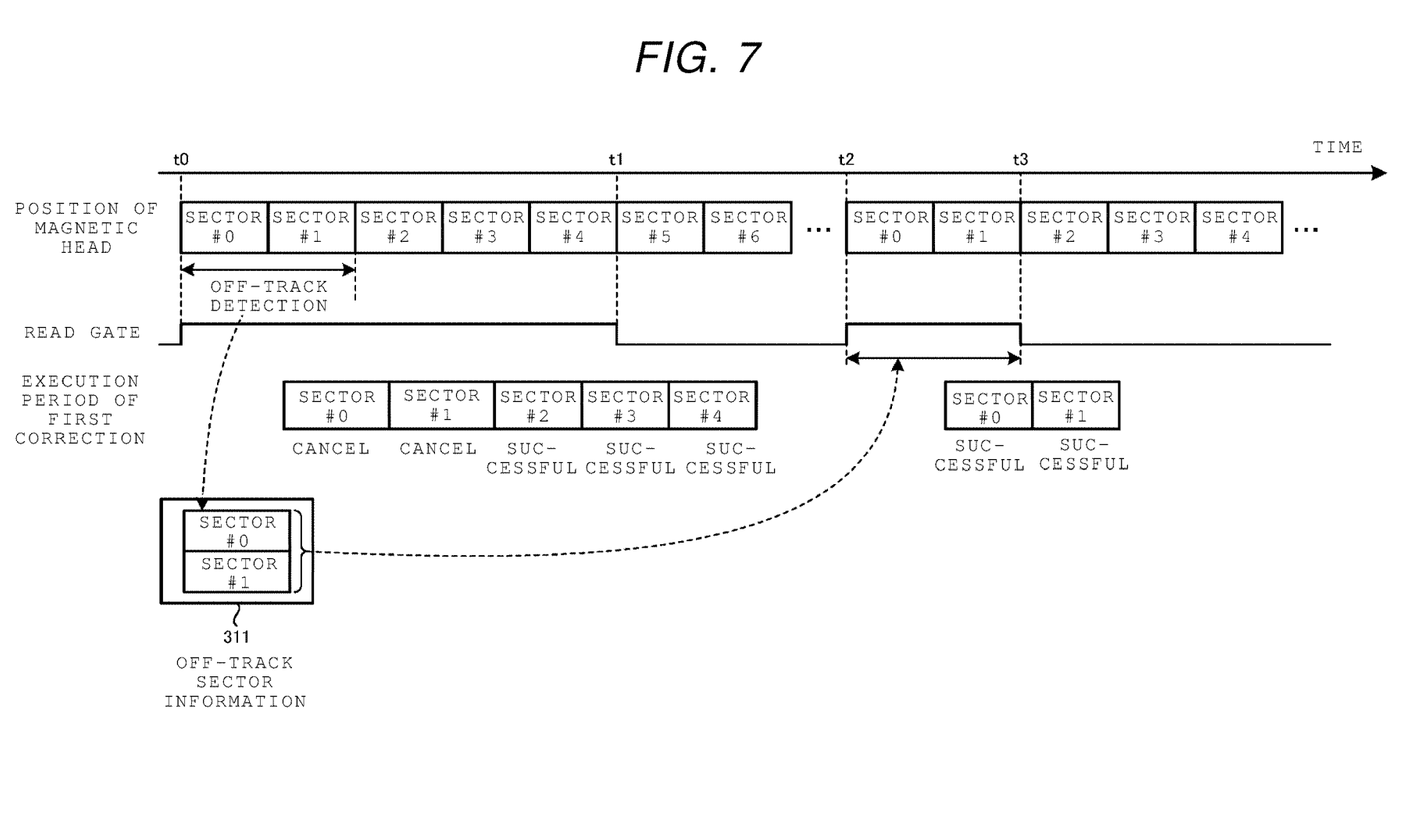
FIG. 7 is a diagram illustrating an example of a timing of each process during reading of a target track of the magnetic disk device according to the first embodiment.

FIG. 7 is a diagram illustrating an example of a timing of each process during reading of the target track 41 of the magnetic disk device 1 according to the first embodiment. In FIG. 7, the horizontal axis indicates the elapsed time. The sector in which the magnetic head 22 is located is drawn as a position of the magnetic head 22. Further, FIG. 7 illustrates sectors for which the first correction is being executed. Further, convenience of illustration, it is assumed that the target track 41 includes sector #0 to sector #6.

Further, FIG. 7 illustrates a waveform of the read gate. The read gate is a signal indicating a timing of instructing the RWC 25 to capture a signal from the read head 22r. The read gate is generated in the controller 30 (for example, the processor 26 or the HDC 23) with reference to the timing at which the servo information is read and is supplied to the RWC 25. The RWC 25 captures the signal during a period indicated by the read gate. In the example illustrated in FIG. 7, in relation to the waveform of the read gate, an H level indicates a period during which the signal capturing is performed, and an L level indicates a period during which the signal capturing is prohibited.

In the example illustrated in FIG. 7, it is assumed that the sector #0 to the sector #4 are the initial read targets. Therefore, during the period in which the magnetic disk 11 makes first one rotation, in the period from the timing t0 when the magnetic head 22 passes through the beginning of the sector #0 to the timing t1 when the magnetic head 22 passes through the end of the sector #4, the controller 30 maintains the read gate at the H level, and the signal output from the read head 22r during this period is captured by the RWC 25 as read data. The RWC 25 executes demodulation including the first correction with respect to the data read from the sector #0 to the sector #4.

Herein, in the example illustrated in FIG. 7, the off-track state is detected when the magnetic head 22 passes through the sector #0 and when the magnetic head 22 passes through the sector #1. Therefore, the controller 30 adds the sector numbers of the sector #0 and the sector #1 to the off-track sector information 311 through the process of S204 illustrated in FIG. 6. Further, the controller 30 cancels the first correction for the data read from the sector #0 and the first correction for the data read from the sector #1 through the process of S205 illustrated in FIG. 6.

When the magnetic disk 11 makes first one rotation, the first correction is successful for the data read from the sector #2 to the sector #4. That is, the controller 30 succeeds in acquiring the expected data from the sector #2 to the sector #4 during the first one rotation of the magnetic disk 11.

After that, when the magnetic disk 11 makes another rotation, the controller 30 executes the read retry operation on the sector #0 and the sector #1 indicated by the off-track sector information 311. The controller 30 does not execute the read retry operation on the sector #2 to the sector #4 from which the expected data have been acquired. Specifically, during the period from the timing t2 when the magnetic head 22 passes through the beginning of the sector #0 to the timing t3 when the magnetic head 22 passes through the end of the sector #1, the controller 30 maintains the read gate at the H level and allows the read gate to be changed from the H level to the L level at the timing t3. The signal output from the read head 22r during the period from the timing t2 to the timing t3 is captured by the RWC 25 and then demodulated.

No off-track state is detected during the period from the timing t2 to the timing t3, and the first correction is successful for the data read during this period, that is, the data read from the sector #0 and the data read from the sector #1. That is, the controller 30 succeeds in acquiring the expected data from the sector #0 and the sector #1.

In this way, the controller 30 executes the read operation and the first correction for each of target sectors when the magnetic disk 11 makes one rotation. After that, the controller 30 executes the read retry operation selectively on each of one or more of the target sectors that include off-track sectors and on-track sectors for which the first correction is unsuccessful.

Therefore, as compared with the comparative example, an increase in the time for acquiring the data and an increase in calculation resources for the error correction can be reduced. That is, the data can be read efficiently when the off-track state occurs.

Further, according to the first embodiment, the controller 30 does not perform or terminate the first correction with respect to a target sector when the off-track state occurs during the read operation on the target sector.

Therefore, when the off-track state occurs, the calculation resource for the error correction can be further reduced.

Second Embodiment

In a second embodiment, a magnetic disk device in which a second correction function is implemented will be described. The magnetic disk device according to the second embodiment is referred to as a magnetic disk device 1a. It is noted that, in the second embodiment, the description of the same configurations, functions, and operations as those of the first embodiment will be omitted or made briefly.

Figure 8:
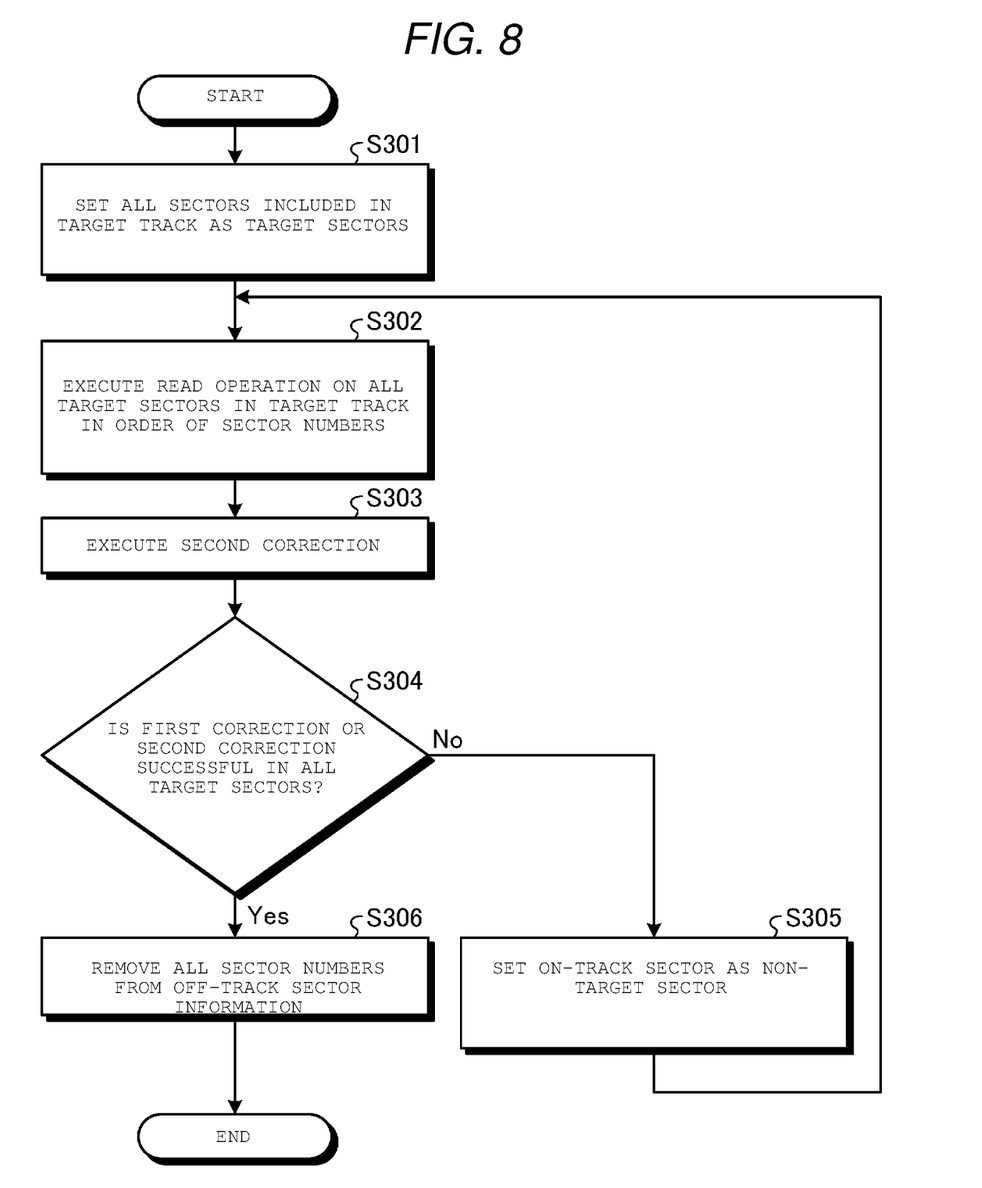
FIG. 8 is a flowchart illustrating an example of a procedure of a read operation on target sectors by a magnetic disk device according to a second embodiment.

FIG. 8 is a flowchart illustrating an example of a procedure of the read operation on target sectors by the magnetic disk device 1*a* according to the second embodiment.

First, the controller 30 sets all sectors in the target track 41 as the target sectors when the magnetic disk 11 makes one rotation (S301). Then, the controller 30 executes a read operation on the target sectors in the target track 41 in the order of sector numbers (S302). In S302, a series of operations illustrated in FIGS. 5 and 6 are executed on each target sector. Further, S302 includes reading of the second ECC written to the sector in the end of the target track 41.

Subsequently, the controller 30 executes the second correction using the data read through the process of S302 (S303).

Then, the controller 30 determines whether the first correction or the second correction is successful in all the target sectors (S304).

For example, when there is one or more off-track sectors and there is one or more on-track sectors for which the first correction fails, the expected data cannot be acquired even through the second correction for the on-track sector for which the first correction fails.

When there is a target sector for which both the first correction and the second correction fail (S304: No), the controller 30 sets each on-track sector as a non-target sector (S305). That is, the controller 30 excludes each on-track sector from the target of the read retry operation. Then, the control proceeds to S302, and the read operation again, that is, the read retry operation is executed with respect to all remaining target sectors.

When the first correction or the second correction is successful in all the target sectors (S304: Yes), the controller 30 remove all sector numbers from the off-track sector information 311 (S306). Then, the reading from the target track 41 is completed. It is noted that, when no sector number is included in the off-track sector information 311, the process of S306 is skipped.

Figure 9:
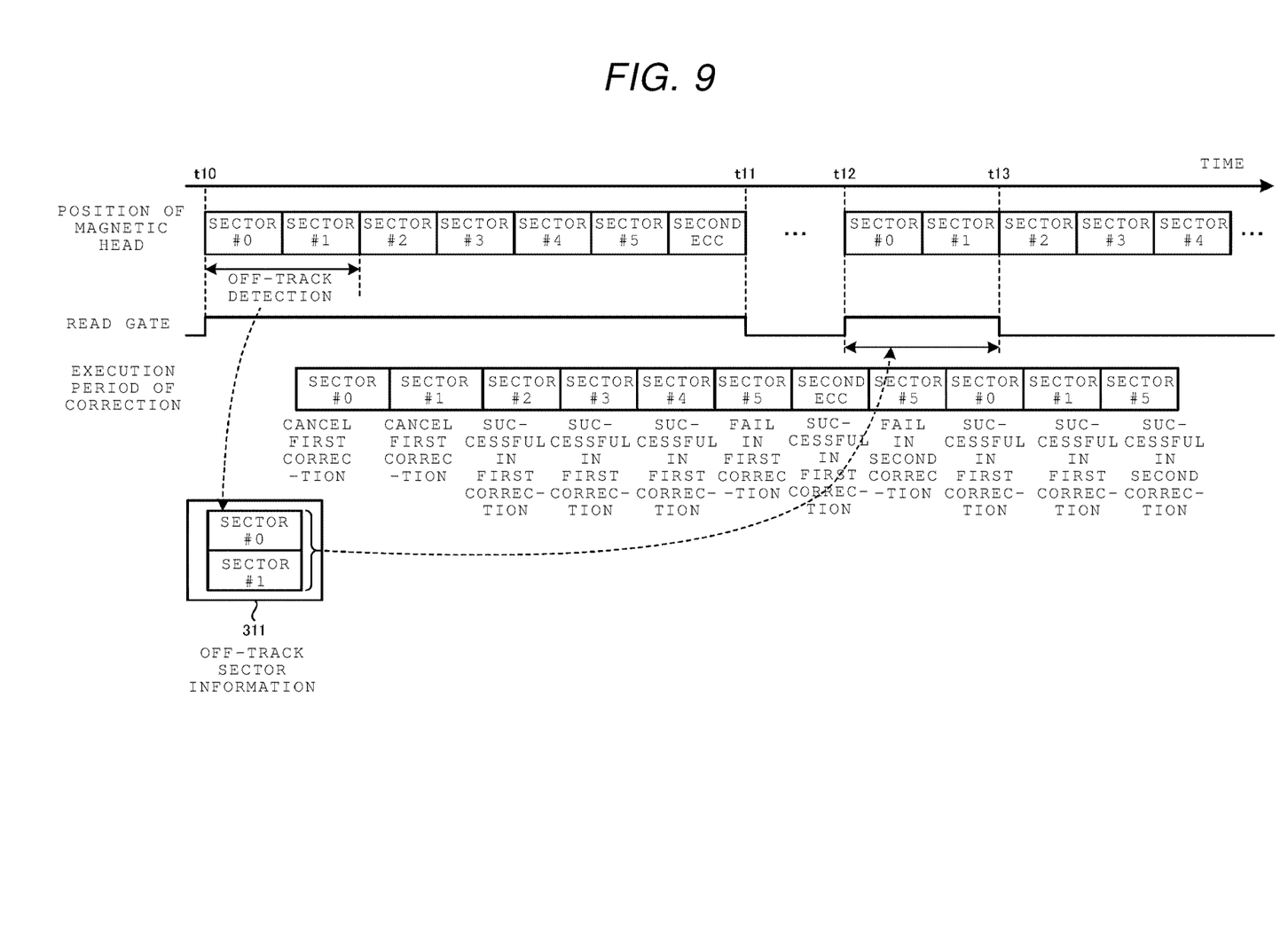
FIG. 9 is a diagram illustrating an example of a timing of each process during reading of a target track of the magnetic disk device according to the second embodiment.

FIG. 9 is a diagram illustrating an example of a timing of each process during reading of the target track 41 of the magnetic disk device 1*a* according to the second embodiment. Similarly to FIG. 7, FIG. 9 illustrates the position of the magnetic head 22 and the waveform of the read gate. In addition, FIG. 9 illustrates the type of error correction executed and the result of the error correction. Further, it is assumed that the target track 41 includes sector #0 to sector #6 and the second ECC is written to the sector #6. It is noted that, for ease of understanding, the "second ECC" is drawn as a sector representing the sector #6.

In the example illustrated in FIG. 9, all sectors in the target track 41, that is, the sector #0 to the sector #6 are set as initial read targets. Therefore, when the magnetic disk 11 makes first one rotation, during the period from the timing t10 when the magnetic head 22 passes through the beginning of the sector #0 to the timing t11 when the magnetic head 22 passes through the end of the sector #6, the controller 30 maintains the read gate at the H level, and the signal output from the read head 22*r* during this period is captured by the RWC 25 as read data and then demodulated. The RWC 25 performs demodulation including the first correction with respect to the data read from the sector #0 to the sector #6.

Herein, in the example illustrated in FIG. 9, the off-track state occurs when the magnetic head 22 passes through the sector #0 and when the magnetic head 22 passes through the sector #1. Therefore, the controller 30 adds the sector numbers of the sector #0 and the sector #1 to the off-track sector information 311 through the process of S204 illustrated in FIG. 6. Further, the controller 30 cancels the first correction for the data read from the sector #0 and the first correction for the data read from the sector #1 through the process of S205 illustrated in FIG. 6.

Further, the controller 30 succeeds in the first correction for the data read from the sector #2 to the sector #4 and the sector #6, and fails in the first correction for the data read from the sector #5. That is, the controller 30 succeeds in acquiring the expected data from the sector #2 to the sector #4 through the first one rotation of the magnetic disk 11, and succeeds in acquiring the second ECC from the sector #6.

After the magnetic disk 11 makes one rotation, the controller 30 executes the second correction by the process of S303 illustrated in FIG. 8. In the second correction, the error correction is executed on the data read from the sector #5 for which the first correction failed.

However, in the example illustrated in FIG. 9, there are sectors (i.e., the sector #0 and the sector #1) for which the first correction is cancelled. Since the data that can be used for the second correction is not obtained from these sectors, the expected data cannot be obtained from the sector #5 through the second correction. Therefore, the controller 30 fails in the second correction for the data read from the sector #5.

Subsequently, the controller 30 executes the read retry operation with respect to the sector #0 and the sector #1 indicated by the off-track sector information 311. The read retry operation is not executed on the sector #2 to the sector #6 for which the read operation has been executed in the on-track state of the magnetic head 22. During the period from the timing t12 when the magnetic head 22 passes through the beginning of the sector #0 to the timing t13 when the magnetic head 22 passes through the end of the sector #1, the controller 30 maintains the read gate at the H level. At the timing t13, the read gate is changed from the H level to the L level. During the period from the timing t12 to the timing t13, the signal output from the read head 22*r* is captured by the RWC 25 and then demodulated.

During the period from timing t12 to timing t13, no off-track state is detected, and the first correction for the data read during this period, that is, the data read from the sector #0 and the data read from the sector #1 is successful.

That is, the controller 30 succeeds in acquiring the expected data from the sector #0 to the sector #1.

When the controller 30 acquires the data for which the first correction is performed from the sector #0 to the sector #1, the data of the sector #0 to the sector #6 are provided. As a result, the second correction can be performed. The controller 30 performs the second correction on the data read from the sector #5 and succeeds in acquiring the expected data of the sector #5. As a result, the controller 30 completes the acquisition of the expected data from all sectors in the track 41.

As described above, also in the second embodiment, similarly to the first embodiment, the execution of the read retry operation on the sector for which the read operation has been executed during the on-track state of the magnetic head 22 and the first correction is successful is omitted.

Therefore, as compared with the comparative example, an increase in the time for acquiring the data and an increase in calculation resources for the error correction can be reduced. That is, the data can be read efficiently even when the off-track state occurs.

Figure 10:
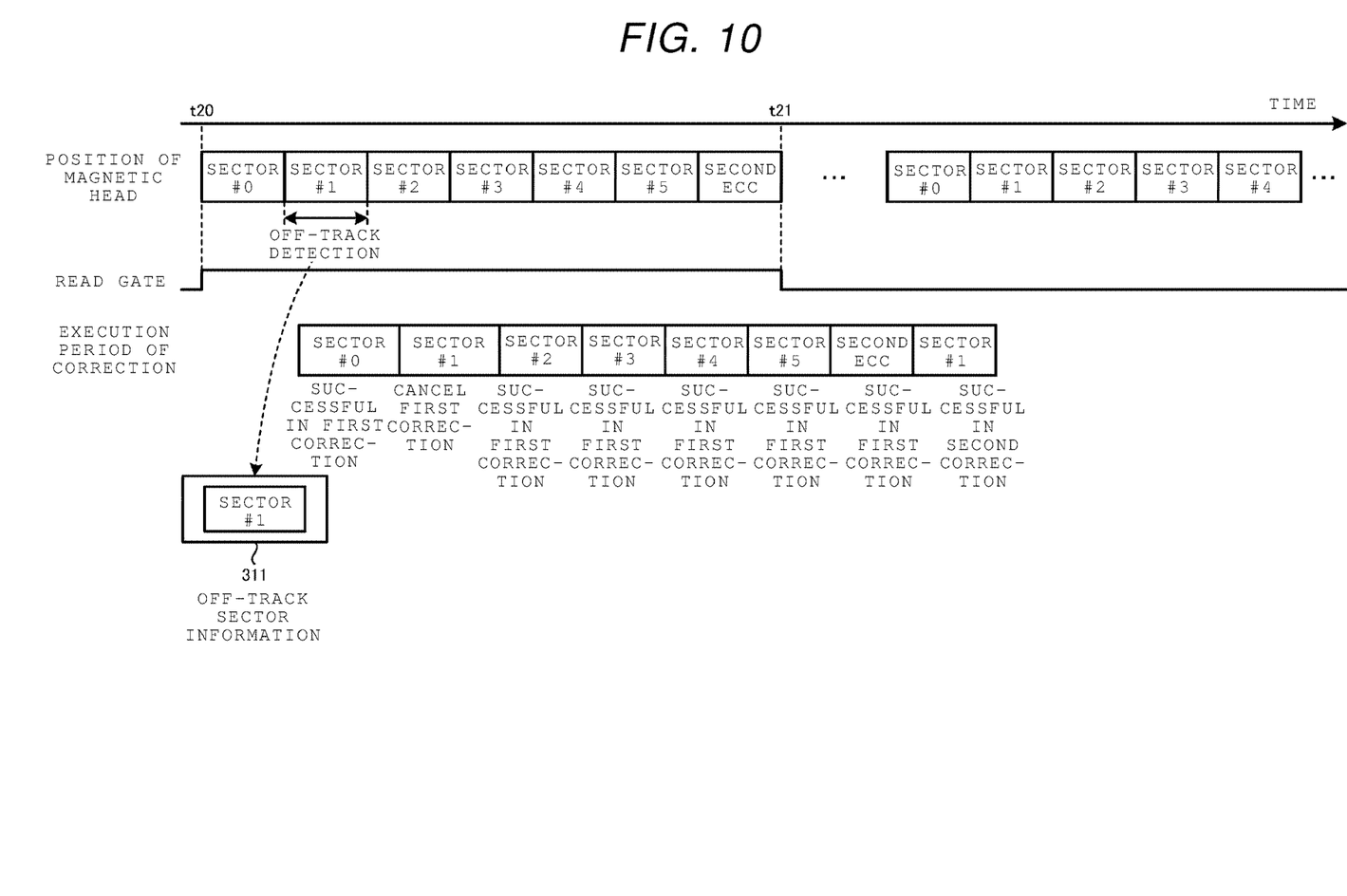
FIG. 10 is a diagram illustrating another example of a timing of each process during reading of a target track of the magnetic disk device according to the second embodiment.

FIG. 10 is a diagram illustrating another example of a timing of each process during reading of the target track 41 of the magnetic disk device 1*a* according to the second embodiment. Similarly to FIG. 7, FIG. 10 illustrates the position of the magnetic head 22 and the waveform of the read gate. In addition, FIG. 10 illustrates the type of error correction executed and the result of the error correction. Further, it is assumed that the sector #0 to the sector #6 are included in one track 41 and the second ECC is written to the sector #6.

In the example illustrated in FIG. 10, similarly to the example illustrated in FIG. 9, all the sectors in the target track 41, that is, the sector #0 to the sector #6 are set as initial read targets. Therefore, when the magnetic disk 11 makes first one rotation, during the period from the timing t20 when the magnetic head 22 passes through the beginning of the sector #0 to the timing t21 when the magnetic head 22 passes through the end of the sector #6, the controller 30 maintains the read gate at the H level, and the signal output from the read head 22r during this period is captured by the RWC 25 as read data and then demodulated. The RWC 25 executes demodulation including the first correction with respect to the data read from the sector #0 to the sector #6.

Herein, in the example illustrated in FIG. 10, the off-track state occurs when the magnetic head 22 passes through the sector #1. Therefore, the controller 30 adds the sector number of the sector #1 to the off-track sector information 311. Further, the controller 30 cancels the first correction for the data read from the sector #1.

Further, the controller 30 succeeds in the first correction for the data read from the sector #0 and the sector #3 to the sector #6. That is, the controller 30 succeeds in acquiring the expected data from the sector #0 and the sector #3 to the sector #5 and succeeds in acquiring the second ECC from the sector #6 by the first one rotation of the magnetic disk 11.

According to the second ECC, when the number of sectors from which data including no error has not been obtained is only one, this data can be obtained through the second correction regardless of whether the cause of not obtaining this data is the off-track state.

The controller 30 executes the second correction through the process of S303 illustrated in FIG. 8 after the magnetic disk 11 makes another rotation after the first one rotation. In the example illustrated in FIG. 10, among the tracks 41, only from the sector #1, which is an off-track sector, data including no error has not been obtained. The controller 30 acquires the data written to the sector #1 without error through the second correction.

As described above, according to the second embodiment, when the number of off-track sectors is one, and there is no target sector for which the read operation has been executed in the on-track state of the magnetic head 22 and the first correction failed, the controller 30 acquires the expected data of the off-track sector through the second correction.

Therefore, it is possible to reduce execution frequency of the read retry operation when the off-track state occurs.

It is noted that, when the number of off-track sectors is two or more, the controller 30 cannot acquire the expected data of all the off-track sectors through the second correction. In such a case, the controller 30 executes the read retry operation with respect to the off-track sectors. Further, even when the number of off-track sectors is one, if there is a sector for which the read operation has been executed in the on-track state of the magnetic head 22 and the first correction failed, the controller 30 cannot acquire the expected data of all the off-track sectors through the second correction. Even in such a case, the controller 30 executes the read retry operation on the off-track sector.

As described above, according to the second embodiment, when all sectors of the target track 41 are the target sectors, the controller 30 executes the read operation on all the target sectors when the magnetic disk 11 makes one rotation and executes the second correction after the read operation on all the target sectors. Then, when the off-track sector exists and the data written in the off-track sector can be acquired through the second correction, the controller 30 does not execute the read retry operation on the off-track sector.

Therefore, even when the off-track state occurs, the data can be read efficiently.

It is noted that, according to the above-mentioned examples, the controller 30 executes the read operation with respect to all target sectors of the target track 41 in the order of sector numbers (S302), and then executes the second correction using the data read through the process of S302 (S303). When it is clear from the result of executing the process of S302 that the second correction fails, the controller 30 may cancel the second correction, that is, S303, and execute the process of S305.

As described above, as a result of the process of S302, when the number of off-track sectors is two or more, or even when the number of off-track sectors is one and there is a sector for which the read operation has been executed in the on-track state of the magnetic head 22 and the first correction fails, the second correction will fail. In such a case, the controller 30 may cancel the execution of the second correction and may proceed to S305.

In the example illustrated in FIG. 9, during the period (timing t10 to t11) in which the magnetic disk 11 makes first one rotation, the number of off-track sectors exceeds one at the time point when the magnetic head 22 passes through the sector #1. Therefore, it becomes clear that the second ECC will fail at this time point. The controller 30 may detect that the number of off-track sectors exceeds one, and thus, may cancel the first execution of the second correction.

It is noted that, in the second embodiment, the interleaving technique may be applied to track-by-track error correction coding.

Figure 11:
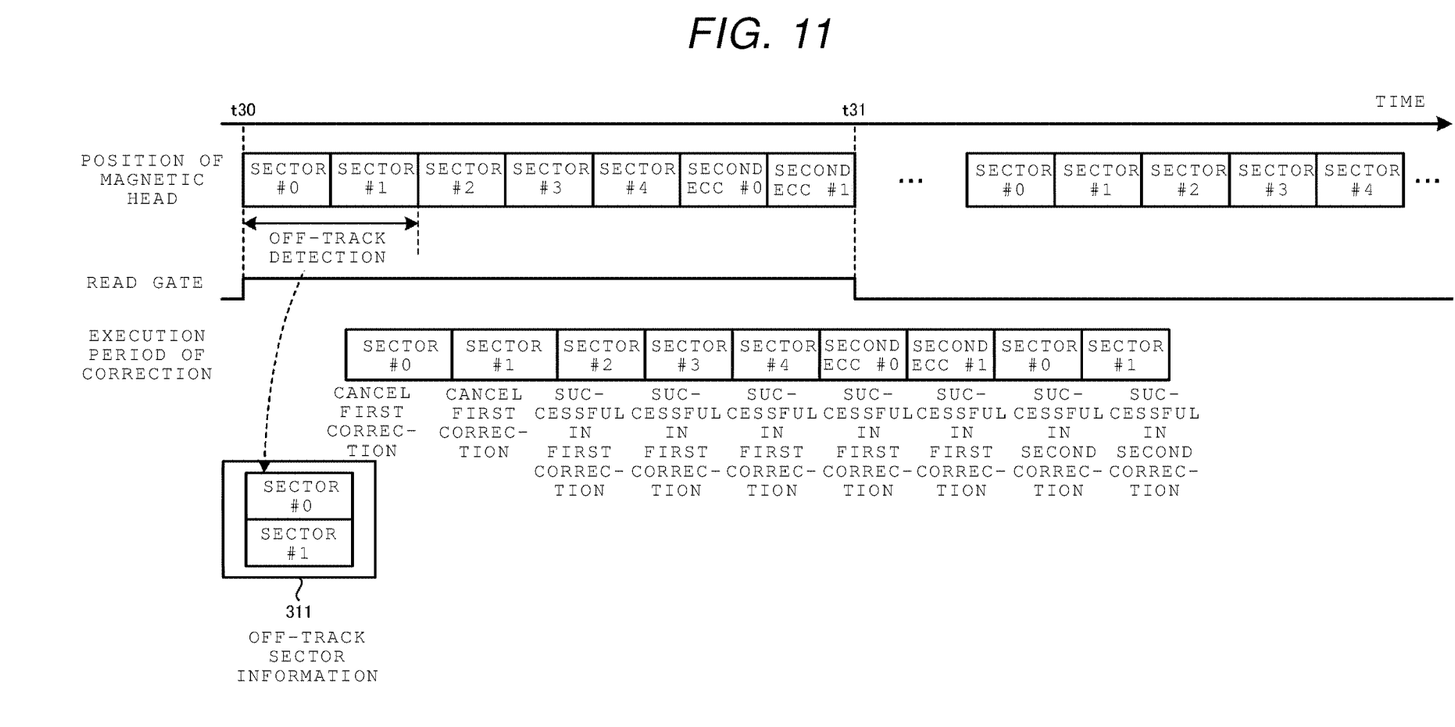
FIG. 11 is a diagram illustrating another example of a timing of each process during reading of a target track when an interleaving technique is applied to the magnetic disk device according to the second embodiment.

FIG. 11 is a diagram illustrating another example of a timing of each process during reading of the target track 41 when the interleaving technique is applied to the magnetic disk device 1a according to the second embodiment. As in FIG. 7, FIG. 11 illustrates the position of the magnetic head 22 and the waveform of the read gate. In addition, FIG. 11 illustrates the type of error correction executed and the result of the error correction. Further, the sector #0 to the sector #6 are provided on one track 41. Then, the second ECC #0 generated on the basis of the data written to the sector #0, the sector #2, and the sector #4 is written to the sector #5, and the second ECC #1 generated on the basis of the data written to the sector #1 and the sector #3 is written to the sector #6.

In the example illustrated in FIG. 11, similarly to the example illustrated in FIG. 9, all the sectors in the target track 41, that is, the sector #0 to the sector #6 are set as initial read targets. Therefore, when the magnetic disk 11 makes first one rotation, during the period from the timing t30 when the magnetic head 22 passes through the beginning of the sector #0 to the timing t31 when the magnetic head 22 passes through the end of the sector #6, the controller 30 maintains the read gate at the H level, and the signal output from the read head 22r during this period is captured into the RWC 25 as read data and then demodulated. The RWC 25 performs demodulation including the first correction with respect to the data read from the sector #0 to the sector #6.

Herein, in the example illustrated in FIG. 11, the off-track state occurs when the magnetic head 22 passes through the sector #0 and when the magnetic head 22 passes through the sector #1. Therefore, the controller 30 adds the sector number of the sector #0 and the sector number of the sector #1 to the off-track sector information 311. Further, the controller 30 cancels the first correction for the data read from the sector #0 and the first correction for the data read from the sector #1.

Further, the controller 30 succeeds in the first correction for the data read from the sector #2 to the sector #6. That is, the controller 30 succeeds in acquiring the expected data from the sector #2 to the sector #4, succeeds in acquiring the second ECC #0 from the sector #5 and the second ECC #1 from the sector #6 by the first one rotation of the magnetic disk 11.

As described above, the second ECC #0 is generated on the basis of the data written to the sector #0, the sector #2, and the sector #4. Therefore, when there is one off-track sector provided in the sector #0, the sector #2, and the sector #4 and there is no target sector for which the read operation has been executed in the on-track state and the first correction failed among the sector #0, the sector #2, and the sector #4, the controller 30 can acquire the expected data of this off-track sector through the second correction.

Further, the second ECC #1 is generated on the basis of the data written to the sector #1 and the sector #3. Therefore, when there is one off-track sector in the sector #1 and the sector #3 and there is no target sector for which the read operation has been executed in the on-track state and the first correction failed among the sector #1 and the sector #3, the controller 30 can acquire the expected data of the off-track sector through the second correction.

In the case of the example illustrated in FIG. 11, since there is one off-track sector in the sector #0, the sector #2, and the sector #4 and there is no target sector for which the read operation has been executed in the on-track state and the first correction failed among the sector #0, the sector #2, and the sector #4, the controller 30 succeeds in acquiring the expected data of the sector #0 through the second correction using the second ECC #0. Further, since there is one off-track sector in the sector #1 and the sector #3 and there is no target sector for which the read operation has been executed in the on-track state and the first correction failed among the sector #1 and the sector #3, the controller 30 succeeds in acquiring the expected data of the sector #1 through the second correction using the second ECC #1.

As the foregoing illustrates, the second embodiment may be combined with the technique of interleaving. It is noted that the technique of interleaving may also be used in combination with the first embodiment.

While certain embodiments have been described, these embodiments have been presented by way of example only, and are not intended to limit the scope of the disclosure. Indeed, the novel embodiments described herein may be embodied in a variety of other forms; furthermore, various omissions, substitutions, and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A magnetic disk device comprising:
a magnetic disk including a track having a plurality of sectors;
a motor configured to rotate the magnetic disk;
a magnetic head; and
a controller configured to:
perform a first read operation of reading target sectors among the sectors of the track, with the magnetic head during a first revolution of the magnetic disk;
detect an off-track state of the magnetic head during the first revolution of the magnetic disk;
perform a first error correction with respect to data read from the target sectors during the first read operation; and
perform a second read operation of selectively reading a part of the target sectors for which the off-track state has been detected or for which the first error correction is unsuccessful, with the magnetic head during a second revolution of the magnetic disk.

2. The magnetic disk device according to claim 1, wherein none of the target sectors for which the first error correction is successful and the off-track state has not been detected is read during the second read operation.

3. The magnetic disk device according to claim 1, wherein the controller performs the first error correction with respect to data read from one or more of the target sectors for which the off-track state has not been detected, and not perform the first error correction with respect to data read from one or more of the target sectors for which the off-track state has been detected.

4. The magnetic disk device according to claim 1, wherein the controller is configured to terminate the first error correction that is being carried out with respect to data read from one of the target sectors for which the off-track state has been detected.

5. The magnetic disk device according to claim 1, wherein the controller is further configured to perform the first error correction with respect to data read from the part of the target sectors during the second read operation.

6. The magnetic disk device according to claim 1, wherein the controller performs the first error correction of data read from a first target sector using an error correction code read from the first target sector, and data read from a second target sector using an error correction code read from the second target sector.

7. A magnetic disk device comprising:
a magnetic disk including a track having a plurality of sectors;
a motor configured to rotate the magnetic disk;
a magnetic head; and
a controller configured to:
perform a write operation of writing data and a first error correction code into each of first sectors of the track and writing a second error correction code for the data written in the first sectors into a second sector of the track;
perform a first read operation of reading the first and second sectors of the track, with the magnetic head during a first revolution of the magnetic disk;
detect an off-track state of the magnetic head during the first revolution of the magnetic disk;
perform a first error correction with respect to data read from the first sectors using the first error correction codes read therefrom, respectively; and
perform a second read operation of selectively reading a part of the first sectors for which the off-track state has been detected, with the magnetic head during a second revolution of the magnetic disk.

8. The magnetic disk device according to claim 7, wherein the controller is further configured to perform a second error correction with respect to data read from one of the first sectors for which the off-track state has been detected or the first error correction is unsuccessful, using the second error correction code read from the second sector.

9. The magnetic disk device according to claim 8, wherein the controller does not perform the second error correction with respect to data read from any of the first sectors for which the first error correction is successful and the off-track state has not been detected.

10. The magnetic disk device according to claim 8, wherein the controller performs the second error correction when a total number of the first sectors for which the off-track state has been detected or the first error correction is unsuccessful is one, and does not perform the second error correction when the total number is two or more.

11. The magnetic disk device according to claim 10, wherein the controller performs the second read operation when a total number of the first sectors for which the off-track state has been detected or the first error correction is unsuccessful is two or more, and does not perform the second read correction when the total number is one.

12. The magnetic disk device according to claim 7, wherein none of the first sectors for which the off-track state has not been detected and either the first error correction or the second error correction is successful is read during the second read operation.

13. The magnetic disk device according to claim 7, wherein the controller is further configured to perform the first error correction with respect to data read from the part of the first sectors during the second read operation.

14. The magnetic disk device according to claim 13, wherein the controller is further configured to perform a second error correction with respect to data read from one of the first sectors for which the first error correction is unsuccessful using the second error correction code read from the second sector during the first read operation and the data read from the part of the first sectors during the second read operation.

15. The magnetic disk device according to claim 7, wherein the controller performs the first error correction with respect to data read from one or more of the first sectors for which the off-track state has not been detected, and not perform the first error correction with respect to data read from one or more of the first sectors for which the off-track state has been detected.

16. The magnetic disk device according to claim 7, wherein the controller is configured to terminate the first error correction with respect to data read from one or more of the first sectors for which the off-track state has been detected.

17. A method for controlling a magnetic disk device including:
a magnetic disk including a track having a plurality of sectors;
a motor configured to rotate the magnetic disk; and
a magnetic head, the method comprising:
performing a first read operation of reading target sectors among the sectors of the track, with the magnetic head during a first revolution of the magnetic disk;
detecting an off-track state of the magnetic head during the first revolution of the magnetic disk;
performing a first error correction with respect to data read from the target sectors during the first read operation; and
performing a second read operation of selectively reading a part of the target sectors for which the off-track state has been detected or the first error correction is unsuccessful, with the magnetic head during a second revolution of the magnetic disk.

18. The method according to claim 17, wherein none of the target sectors for which the first error correction is successful and the off-track state has not been detected is read during the second read operation.

19. The method according to claim 17, wherein the first error correction is performed with respect to data read from one or more of the target sectors for which the off-track state has not been detected, and not performed with respect to data read from one or more of the target sectors for which the off-track has been detected.

20. The method according to claim 17, further comprising: terminating the first error correction with respect to data read from one or more of the target sectors for which the off-track has been detected.

* * * * *